UNITED STATES PATENT OFFICE.

JULES ADOLPHE BESSON, OF CAEN, FRANCE.

PROCESS OF PURIFYING AND CONCENTRATING SUGAR-JUICES.

No. 846,543.      Specification of Letters Patent.      Patented March 12, 1907.

Application filed May 4, 1904. Serial No. 206,305.

*To all whom it may concern:*

Be it known that I, JULES ADOLPHE BESSON, a citizen of the French Republic, and a resident of Caen, France, have invented certain new and useful Improvements in Processes of Preventing Incrustation in Sugar Evaporation, of which the following is a specification.

This invention relates to incrustation preventatives, and particularly to a process of preventing incrustation in the evaporation of sugar-juice.

I have discovered that if precipitated gelatinous alumina be added to sugar-juices prior to their concentration it will effectively prevent the formation of incrustation on the walls of the concentrating apparatus. In the practical application of my process in which this discovery is utilized I add to sugar-juice prior to concentration a relatively small amount of precipitated gelatinous alumina and concentrate the liquid in the usual way. Gelatinous alumina suitable for use in my process may be prepared by treating solutions of aluminium salts—alum, for example—with sulfid of ammonia, and the resulting product is added to the sugar-juice, preferably in the proportion of from .01 gram to .05 grams to each liter of juice of a density of from 1.050 to 1.060, the exact amount of alumina to be added depending upon the nature and normal amount of the incrustation deposit from a given volume of juice. The addition of the gelatinous alumina is made when the juice is admitted to the concentration apparatus and is removed by filtration after concentration.

Having now fully described my invention and the best manner known of carrying the same into effect, what I claim is—

The process of preventing incrustation in the evaporation of sugar-juice which consists in adding precipitated gelatinous alumina to the said juice prior to evaporation, substantially as herein described.

In testimony whereof I have hereunto set my hand in presence of two witnesses.

JULES ADOLPHE BESSON.

Witnesses:
     HENRI JOSEPH ROSSET,
     W. F. DELHAQ.